(12) United States Patent
Shi et al.

(10) Patent No.: US 12,705,481 B2
(45) Date of Patent: Aug. 11, 2026

(54) SEARCH METHOD, ELECTRONIC DEVICE AND STORAGE MEDIUM BASED ON NEURAL NETWORK MODEL

(71) Applicant: BEIJING BAIDU NETCOM SCIENCE TECHNOLOGY CO., LTD., Beijing (CN)

(72) Inventors: Hongjian Shi, Beijing (CN); Xinwei Feng, Beijing (CN); Feifei Li, Beijing (CN); Chenyang Guo, Beijing (CN); Xueqian Wu, Beijing (CN); Meng Tian, Beijing (CN); Yu Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 904 days.

(21) Appl. No.: 17/901,803

(22) Filed: Sep. 1, 2022

(65) Prior Publication Data

US 2022/0414474 A1 Dec. 29, 2022

(30) Foreign Application Priority Data

Oct. 21, 2021 (CN) ......................... 202111229493.2

(51) Int. Cl.
*G06N 3/08* (2023.01)
*G06F 16/953* (2019.01)

(52) U.S. Cl.
CPC ............. *G06N 3/08* (2013.01); *G06F 16/953* (2019.01)

(58) Field of Classification Search
CPC ................................ G06N 3/08; G06F 16/953
See application file for complete search history.

(56) References Cited

U.S. PATENT DOCUMENTS

2011/0314006 A1 12/2011 Sweeney et al.
2016/0098403 A1* 4/2016 Lee .................. G06F 16/24578 707/749

(Continued)

FOREIGN PATENT DOCUMENTS

CN 106547871 3/2017
CN 107491518 A 12/2017

(Continued)

OTHER PUBLICATIONS

Tao, Yanyun et al. "A Multitask Learning Neural Network for Short-Term Traffic Speed Prediction and Confidence Estimation", Sep. 9, 2019, ICANN 2019. Lecture Notes in Computer Science( ), vol. 11728, pp. 434-449 (Year: 2019).*

(Continued)

*Primary Examiner* — Haimei Jiang
*Assistant Examiner* — Thomas Bernard Lane
(74) *Attorney, Agent, or Firm* — MASCHOFF BRENNAN; Ran Pang; Liang Huang

(57) ABSTRACT

A search method based on a neural network model is provided. The neural network model includes a semantic representation model, a recall model, and a ranking model. The present disclosure relates to the field of artificial intelligence, and in particular to the technical field of search. An implementation of the method comprises: inputting a target search and a plurality of objects to be matched to the semantic representation model to obtain a first output of the semantic representation model; inputting the first output of the semantic representation model to the recall model, and obtaining at least one recall object matching the target search from the plurality of objects to be matched by using the recall model; and inputting a second output of the semantic representation model to the ranking model, and obtaining a (Continued)

matching value of each of the at least one recall object by using the ranking model.

20 Claims, 6 Drawing Sheets

(56) References Cited

U.S. PATENT DOCUMENTS

2016/0232238 A1 8/2016 Sweeney et al.
2019/0057159 A1 2/2019 Ll et al.
2021/0200956 A1* 7/2021 Ding ....................... G06F 40/30

FOREIGN PATENT DOCUMENTS

CN 111538908 A * 8/2020 ........... G06F 18/214
CN 112164391 A 1/2021
CN 112650907 A 4/2021
CN 113159187 A 7/2021

OTHER PUBLICATIONS

Liang, Ming et al. "A multi-perspective combined recall and rank framework for Chinese procedure terminology normalization", Jan. 25, 2021, arXiv, pp. 1-18 (Year: 2021).*

Xie Xianzhang, et al., "Cross-Domain Semantic Information Retrieval Based on Convolutional Neural Network," Faculty of Information Engineering and Automation, Kunming University of Science and Technology, Kunming 650500, Yunan, China, pp. 73-78.

Quang-Minh Nguyen, et al., "A novel approach for automatic extraction of semantic data about football transfer in sport news," International Journal of Pervasive Computing and Communications, vol. 11 No. 2, 2015, pp. 233-252.

* cited by examiner

SEARCH METHOD, ELECTRONIC DEVICE AND STORAGE MEDIUM BASED ON NEURAL NETWORK MODEL

CROSS REFERENCE TO RELATED APPLICATIONS

This application claims priority to Chinese Patent Application No. 202111229493.2 filed on Oct. 21, 2021, the content of which is hereby incorporated by reference in its entirety for all purposes.

TECHNICAL FIELD

The present disclosure relates to the technical field of artificial intelligence, in particular to the technical field of intelligent search and deep learning, and specifically to a search method, an electronic device and a computer-readable storage medium based on a neural network model.

BACKGROUND

Artificial intelligence is a subject on making a computer simulate some thinking processes and intelligent behaviors (such as learning, reasoning, thinking, and planning) of a human, and involves both hardware-level technologies and software-level technologies.

Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

In a search scenario, how to improve a ranking effect by using an artificial intelligence technology is especially important. A better ranking effect can help a user obtain required information more quickly, improve user experience, and meet a requirement for accurate retrieval of specific data in massive data.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a search method, an electronic device and a computer-readable storage medium based on a neural network model.

According to an aspect of the present disclosure, there is provided a search method based on a neural network model, the neural network model including a semantic representation model, a recall model, and a ranking model, and the method including: inputting, to the semantic representation model, a target search and a plurality of objects to be matched to obtain a first output of the semantic representation model, where the first output has a semantic understanding representation of recall and ranking; inputting the first output of the semantic representation model to the recall model, and obtaining at least one recall object matching the target search from the plurality of objects to be matched by using the recall model; and inputting a second output of the semantic representation model to the ranking model, and obtaining a matching value of each of the at least one recall object by using the ranking model, where the second output of the semantic representation model is obtained based on the target search and the at least one recall object.

According to an aspect of the present disclosure, there is provided a training method for a neural network model for searching, the neural network model including a semantic representation model, a feature extraction model, a recall model, and a ranking model, and the training method including a training method for the semantic representation model and the feature extraction model, a training method for the recall model, and a training method for the ranking model, where the training method for the semantic representation model and the feature extraction model includes: obtaining a first sample search and a first sample object, and marking a first real classification label and a first real matching value of the first sample object, where the first real classification label can represent whether the first sample object matches the first sample search, and the first real matching value can represent a degree of matching between the first sample object and the first sample search; inputting the first sample search and the first sample object to the semantic representation model to obtain a third output of the semantic representation model; inputting the third output of the semantic representation model to the feature extraction model to obtain a first predicted classification label and a first predicted matching value of the first sample object; calculating a first loss value based on the first real classification label and the first real matching value of the first sample object and the first predicted classification label and the first predicted matching value of the first sample object; and adjusting a parameter of the semantic representation model and a parameter of the feature extraction model based on the first loss value, where the training method for the recall model and the training method for the ranking model are performed in response to completion of training for the semantic representation model and the feature extraction model, and an input to the recall model and an input to the ranking model each comprises an output of the semantic representation model.

According to an aspect of the present disclosure, there is provided an electronic device, including: at least one processor; and a memory communicatively connected to the at least one processor, where the memory stores instructions executable by the at least one processor, and when executed by the at least one processor, the instructions cause the at least one processor to perform the method described above.

According to an aspect of the present disclosure, there is provided a non-transitory computer-readable storage medium storing computer instructions, where the computer instructions are used to cause the computer to perform the method described above.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTIONS OF THE DRAWINGS

The accompanying drawings show embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION

Figure 1:
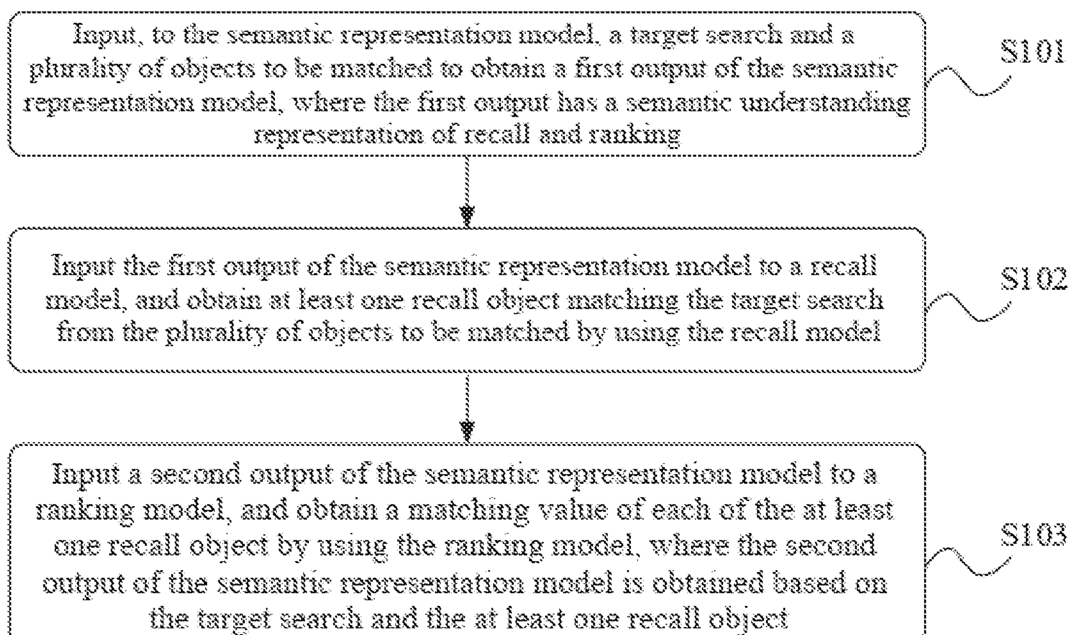
FIG. 1 is a flowchart of a search method based on a neural network model according to an embodiment of the present disclosure.

Example embodiments of the present disclosure are described below with reference to the accompanying drawings, where various details of the embodiments of the present disclosure are included for a better understanding, and should be considered as merely example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

In the prior art related to search, the search can be divided into two steps: recall and ranking. A recall stage and a ranking stage use different semantic representation models for respective iteration and optimization due to different targets; the recall stage focuses on quickly screening a large amount of data coarsely, while the ranking stage needs to rank recalled data finely, and the two stages have different targets. The inventor finds through research that this construction mode may cause a disjunction of optimization targets in the recall stage and the ranking stage, the recall stage only focuses on whether an object to be matched matches a target search, but does not focus on a specific degree of matching. Consequently, data with a low matching value is recalled while highly matching data cannot be recalled. The ranking stage focuses on a relative difference of a degree of matching between different recall objects, but does not focus much on an absolute degree of matching between a recall object and the target search. Consequently, even if all data matching values are low, the ranking stage is unable to give an early warning indication on the degree of matching, and unable to indicate that the degree of matching between found results under the target search is low, thus affecting a ranking and searching effect.

To solve the above problems, in the present disclosure, two stages of recall and ranking share one semantic representation model, and the semantic representation model can meet semantic representation requirements of recall and ranking, so that the two stages have the same semantic representation. As a result, a target and distribution of parameters of the two stages are made more consistent, thus improving a ranking effect.

The embodiments of the present disclosure will be described below in detail with reference to the accompanying drawings.

FIG. 1 is a flowchart of a search method based on a neural network model according to an embodiment of the present disclosure, the neural network model including a semantic representation model, a recall model, and a ranking model.

As shown in FIG. 1, the search method 100 based on the neural network model may include: step S101: inputting, to the semantic representation model, a target search and a plurality of objects to be matched to obtain a first output of the semantic representation model, where the first output has a semantic understanding representation of recall and ranking; step S102: inputting the first output of the semantic representation model to the recall model, and obtaining at least one recall object matching the target search from the plurality of objects to be matched by using the recall model; and step S103: inputting a second output of the semantic representation model to the ranking model, and obtaining a matching value of each of the at least one recall object by using the ranking model, where the second output of the semantic representation model is obtained based on the input target search and the at least one recall object.

Therefore, the recall model in the neural network model is used to recall a matching object based on the target search, and then the ranking model calculates the matching value of a recalled object and ranks the recalled object based on the matching value. Operations of the recall model and the ranking model are both based on the semantic representation model. The semantic representation model can meet semantic representation requirements of recall and ranking such that a recall stage and a ranking stage have the same semantic representation for a search object and the objects to be matched, and a target and distribution of parameters of the two stages are more consistent, thus improving a final ranking effect.

According to some embodiments, the neural network model further includes a feature extraction model, and the feature extraction model is configured to: obtain, based on the input first output of the semantic representation model, one or more recall objects and a matching value of each of the one or more recall objects. Therefore, by introducing the feature extraction model, the semantic representation model can meet the semantic representation requirements of recall and ranking, so that an output of the semantic representation model has the semantic understanding representation of recall and ranking. It can be understood that the feature extraction model may also be used to recall and rank, based on the semantic representation output by the semantic representation model, an object matching the target search, to obtain a search result having a better ranking effect.

According to an aspect of the present disclosure, there is further provided a training method for a neural network model for searching, the neural network model including a semantic representation model, a feature extraction model, a recall model, and a ranking model. The training method includes a training method for the semantic representation model and the feature extraction model, a training method for the recall model, and a training method for the ranking model.

Figure 2:
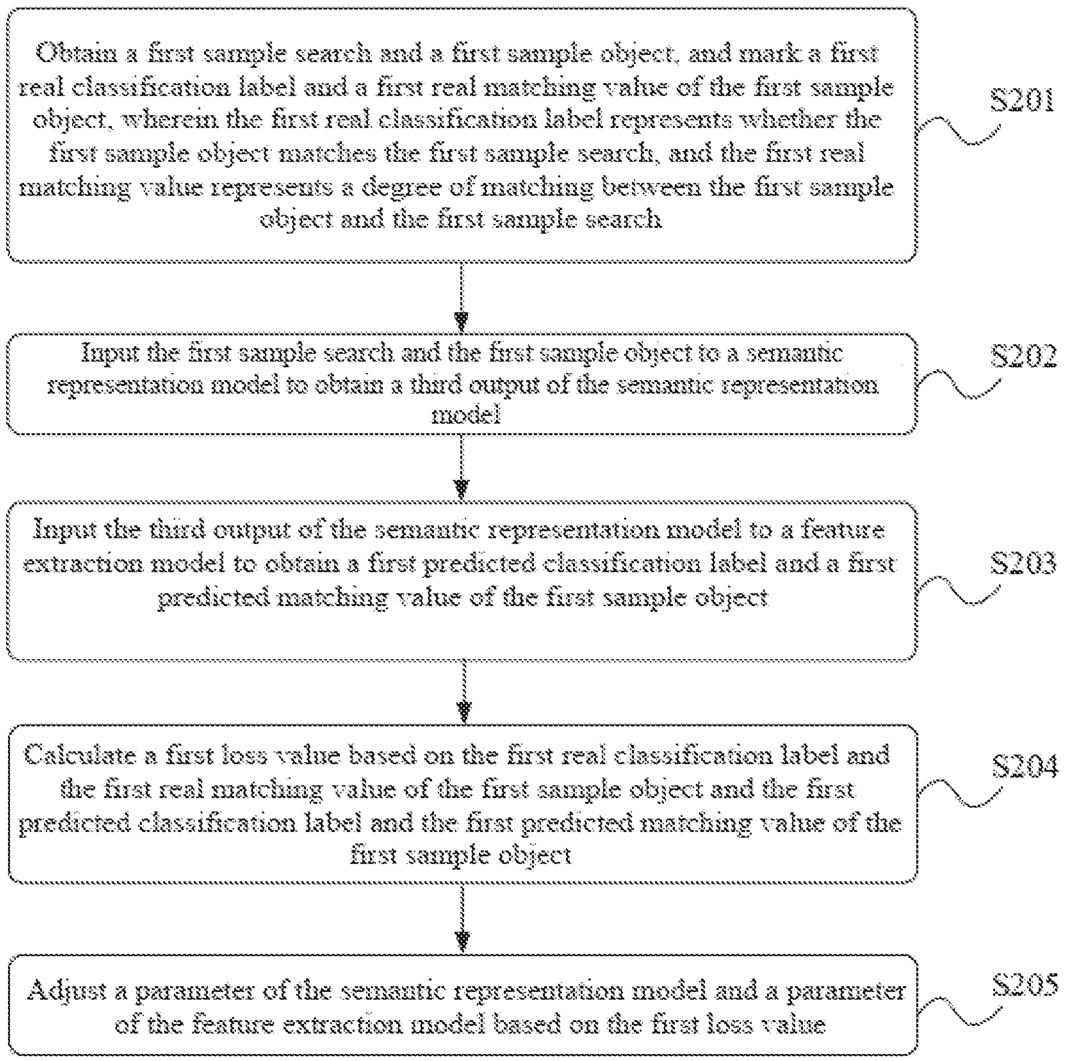
FIG. 2 is a flowchart of a training method for a semantic representation model and a feature extraction model according to an embodiment of the present disclosure.

FIG. 2 is a flowchart of a training method for a semantic representation model and a feature extraction model according to an embodiment of the present disclosure. As shown in FIG. 2, the training method 200 for the semantic representation model and the feature extraction model may include step S201, which obtains a first sample search and a first sample object, and marks a first real classification label and a first real matching value of the first sample object, where the first real classification label can represent whether the first sample object matches the first sample search, and the first real matching value can represent a degree of matching between the first sample object and the first sample search. The training method 200 further includes step S202, which inputs the first sample search and the first sample object to the semantic representation model to obtain a third output of the semantic representation model. The training method 200 further includes step S203, which inputs the third output of the semantic representation model to the feature extraction model to obtain a first predicted classification label and a first predicted matching value of the first sample object that are output by the feature extraction model. The training method 200 further includes step S204, which calculates a first loss value based on the first real classification label and the first real matching value of the first sample object and the first predicted classification label and the first predicted matching value of the first sample object. The training method 200 further includes step S205, which adjusts a parameter of the semantic representation model and a parameter of the feature extraction model based on the first loss value.

Therefore, the semantic representation model and the feature extraction model are used to predict whether sample data matches a sample search and a specific matching value between the sample data and the sample search. A predicted value is compared with a corresponding real value to calculate the first loss value, which can be used to adjust the parameter of the semantic representation model and the parameter of the feature extraction model. A trained semantic representation model and a trained feature extraction model are finally obtained through a plurality of rounds of training of a large amount of sample data, so that the trained semantic representation model can meet semantic representation requirements of recall and ranking. The recall model and ranking model are subsequently trained based on an output of the semantic representation model, so that the consistency between a recall step and a ranking step can be improved, and recall can be optimized and ranking tasks can be better completed.

According to some embodiments, the first loss value includes a first sub-loss value and a second sub-loss value, and the calculating a first loss value includes: calculating the first sub-loss value based on the first real classification label of the first sample object and the first predicted classification label of the first sample object; calculating the second sub-loss value based on the first real matching value of the first sample object and the first predicted matching value of the first sample object; and calculating the first loss value based on the first sub-loss value and a first weight thereof and the second sub-loss value and a second weight thereof, where the training method for the semantic representation model and the feature extraction model further includes: adjusting the first weight and the second weight based on the first loss value.

Therefore, the first sub-loss value and the second sub-loss value are used to separately quantify predicted loss values indicating whether the sample data matches the sample search and the specific matching value between the sample data and the sample search. A final first loss value is calculated based on weighting the first sub-loss value and the second sub-loss value in the training process. The first loss value is used to adjust the parameter of the semantic representation model and the parameter of the feature extraction model, so that the semantic representation model can better meet the semantic representation requirements of recall and ranking. The consistency between the recall step and the ranking step is further improved, and the recall can be optimized and the ranking tasks can be better completed.

The first sub-loss value is used to optimize prediction performance of the semantic representation model and the feature extraction model on whether the first sample object matches the target search, so that the models can focus on an absolute relevance between the first sample object and the target search. The second sub-loss value is used to optimize prediction performance of the semantic representation model and the feature extraction model on a specific degree of matching between the first sample object and the target search, so that the models can focus on relevance ranking of the first sample object. Therefore, the first loss value including the first sub-loss value and the second sub-loss value has an ability to focus on both the relevance ranking and the absolute relevance. The semantic representation model and the feature extraction model are adjusted by the first loss value, so that a final trained semantic representation model and feature extraction model are optimized to have the ability to focus on both the relevance ranking and the absolute relevance, and to improve a ranking effect when the models are used in search.

In an example, the first sub-loss value may be calculated by a cross entropy loss function, and the second sub-loss value may be calculated by a ranking loss function. When a training method is performed, different weights are assigned to the two types of loss functions based on performance of the models, so that the two have different propagation strength and propagation layers in a model network, and are used to calculate the final first loss value to obtain the best optimization effect.

According to some embodiments, the first sample object includes a positive example object that matches the first sample search and a negative example object that does not match the first sample search. Such positive and negative example objects are constructed as training samples, such that the models have an ability to predict whether input data matches the target search. In this case, in some embodiments, the first real classification label of the first sample object includes a real classification label of the positive example object and a real classification label of the negative example object. The first predicted classification label of the first sample object includes a predicted classification label of the positive example object and a predicted classification label of the negative example object. The first real matching value of the first sample object includes a real similarity between the positive example object and the negative example object. The first predicted matching value of the first sample object includes a predicted similarity between the positive example object and the negative example object. The first loss value can be calculated according to the following formula:

$$\text{Loss} = \alpha_1 * CrossEntropyLoss(C_1, \text{label}_1) + \alpha_2 * CrossEntropyLoss(C_2, \text{label}_2) + \alpha_3 * RankLoss(C_1, C_2, \text{label}_3)$$

In the above formula, CrossEntropyLoss represents the cross entropy loss function, RankLoss represents the ranking loss function, $\alpha_1$ and $\alpha_2$ represent weights of a cross entropy loss value in the first loss value, and $\alpha_3$ represents a weight of a ranking loss value in the first loss value; $C_1$ represents the positive example object in the first sample object, and $\text{label}_1$ is the real classification label of the positive example object, and correspondingly, $C_2$ represents a negative example object in the first sample object, $\text{label}_2$ is a real classification label of the negative example object, and $\text{label}_3$ represents the real similarity between the positive example object and the negative example object.

In some embodiments, the first sample object may further include a first positive example object that matches the first sample search and a second positive example object that matches the first sample search. In this case, a constructed composite loss function may be the same as the above example, and will not be described in detail herein. It can be understood that a corresponding composite loss function may be constructed according to a specific case of the first sample object, which is not limited herein.

According to some embodiments, the first sample object includes a highly matching object having a high degree of matching with the first sample search, a moderately matching object having a moderate degree of matching with the first sample search, and a low-degree matching object having a low degree of matching with the first sample search. In some embodiments, the degree of matching may be further divided more finely and more accurately, and the first sample object for training the model is constructed based on a more accurate matching interval, to obtain a better ranking effect.

In an example, training data used to train the semantic representation model and the feature extraction model may be constructed to have the following data structure: the first sample search, the first sample object, the first real classification label of the first sample object, and the first real matching value of the first sample object.

According to some embodiments, the training method for the recall model and the training method for the ranking model are performed in response to completion of training for the semantic representation model and the feature extraction model, and an input to the recall model and an input to the ranking model each are an output of the semantic representation model. During a training process of the recall model and/or a training process of the ranking model, the parameter of the semantic representation model is fixed. It can be understood that the feature extraction model provides a specific training scenario for training of the semantic representation model, so that a trained semantic representation model is more applicable to a search scenario. The trained semantic representation model is used to train the recall model and the ranking model based on a corresponding recall scenario and a ranking scenario respectively, so that the recall model and the ranking model are trained based on more accurate tasks to obtain a better training effect, and obtain a better ranking effect when applied to the search scenario.

According to some embodiments, at least one of the recall model and the ranking model is a pre-trained model. It can be understood that after the training for the semantic representation model is completed, parameters of a pre-trained recall model and a pre-trained ranking model can be adjusted based on the trained semantic representation model in a real recall scenario and a real ranking scenario respectively, so that the recall model and the ranking model have more accurate prediction performance on a real recall task and a real ranking task.

A more specific description of training methods for the recall scenario and the ranking scenario will be described below.

Figure 3:
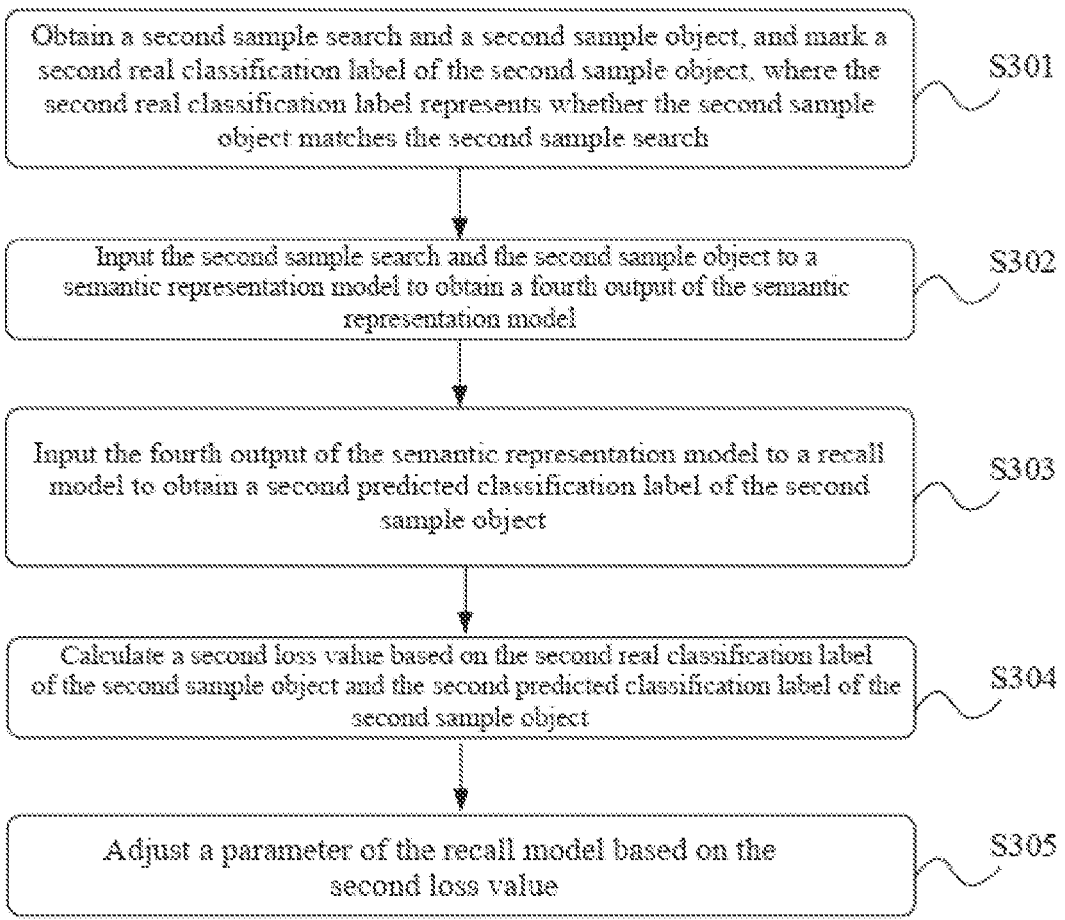
FIG. 3 is a flowchart of a training method for a recall model according to an embodiment of the present disclosure.

FIG. 3 is a flowchart of a training method for a recall model according to an embodiment of the present disclosure. As shown in FIG. 3, the training method 300 for the recall model may include step S301, which obtains a second sample search and a second sample object, and marking a second real classification label of the second sample object, where the second real classification label can represent whether the second sample object matches the second sample search. The training method 300 may further include step S302, which inputs the second sample search and the second sample object to the semantic representation model to obtain a fourth output of the semantic representation model. The training method 300 may further include step S303, which: inputs the fourth output of the semantic representation model to the recall model to obtain a second predicted classification label of the second sample object that is output by the recall model. The training method 300 may further include step S304, which calculates a second loss value based on the second real classification label of the second sample object and the predicted classification label of the second sample object. The training method 300 may further include step S305, which adjusts only a parameter of the recall model based on the second loss value.

In an example, the recall model is obtained by performing parameter adjustment on a pre-trained recall model based on a semantic representation output by a trained semantic representation model in a recall scenario. Therefore, it is necessary to construct a corresponding small amount of training data based on a specific recall task to optimize and adjust the parameter of the pre-trained recall model.

According to some embodiments, the second sample object includes a positive sample object that matches the second sample search and a negative sample object that does not match the second sample search. It can be understood that the recall model is applied to a recall stage in a search, and is intended to recall data matching a target search in a large amount of data to be matched, that is, to make binary classification prediction on objects to be matched: whether the objects to be matched match the target search. Therefore, it is necessary to construct a corresponding training sample to train the recall model, and a constructed training data structure may include the second sample search, the second sample object, and the second real classification label corresponding to the second sample object.

Figure 4:
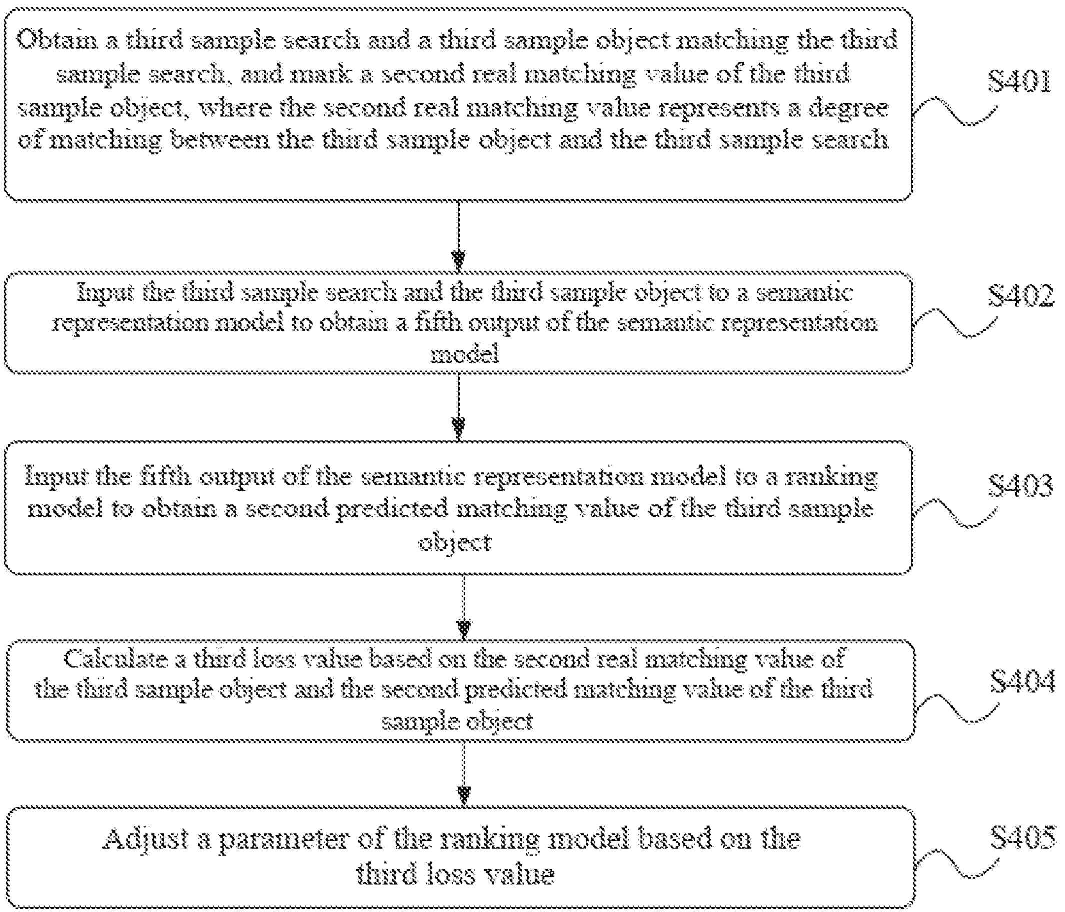
FIG. 4 is a flowchart of a training method for a ranking model according to an embodiment of the present disclosure.

FIG. 4 is a flowchart of a training method for a ranking model according to an embodiment of the present disclosure. As shown in FIG. 4, the training method 400 for the ranking model may include step S401, which obtains a third sample search and a third sample object matching the third sample search, and marking a second real matching value of the third sample object, where the second real matching value can represent a degree of matching between the third sample object and the third sample search. The training method 400 may further include step S402, which inputs the third sample search and the third sample object to the semantic representation model to obtain a fifth output of the semantic representation model. The training method 400 may further include step S403, which inputs the fifth output of the semantic representation model to the ranking model to obtain a second predicted matching value of the third sample object that is output by the ranking model. The training method 400 may further include step S404, which calculates a third loss value based on the second real matching value of the third sample object and the predicted matching value of the third sample object. The training method 400 may further include step S405, which adjusting a parameter of the ranking model based on the third loss value.

In an example, the ranking model is obtained by performing parameter adjustment on a pre-trained ranking model based on a semantic representation output by a trained semantic representation model in a ranking scenario. Therefore, it is necessary to construct a corresponding small amount of training data based on a specific ranking task to optimize and adjust the parameter of the pre-trained ranking model.

According to some embodiments, the second real matching value lies in an interval [0,1]. It can be understood that the ranking model is applied to a ranking stage in a search, and is intended to perform more accurate ranking on data recalled by the recall model for a specific degree of matching, that is, to perform multi-classification prediction on a recalled object, and to calculate a relatively accurate matching value for a degree of matching between the recalled object and a target search. Therefore, it is necessary to construct corresponding training samples with different degrees of matching whose matching values lie in the interval [0,1] to train the ranking model, and a constructed training data structure may include the third sample search, the third sample object, and the second real matching value of the third sample object.

Figure 5:
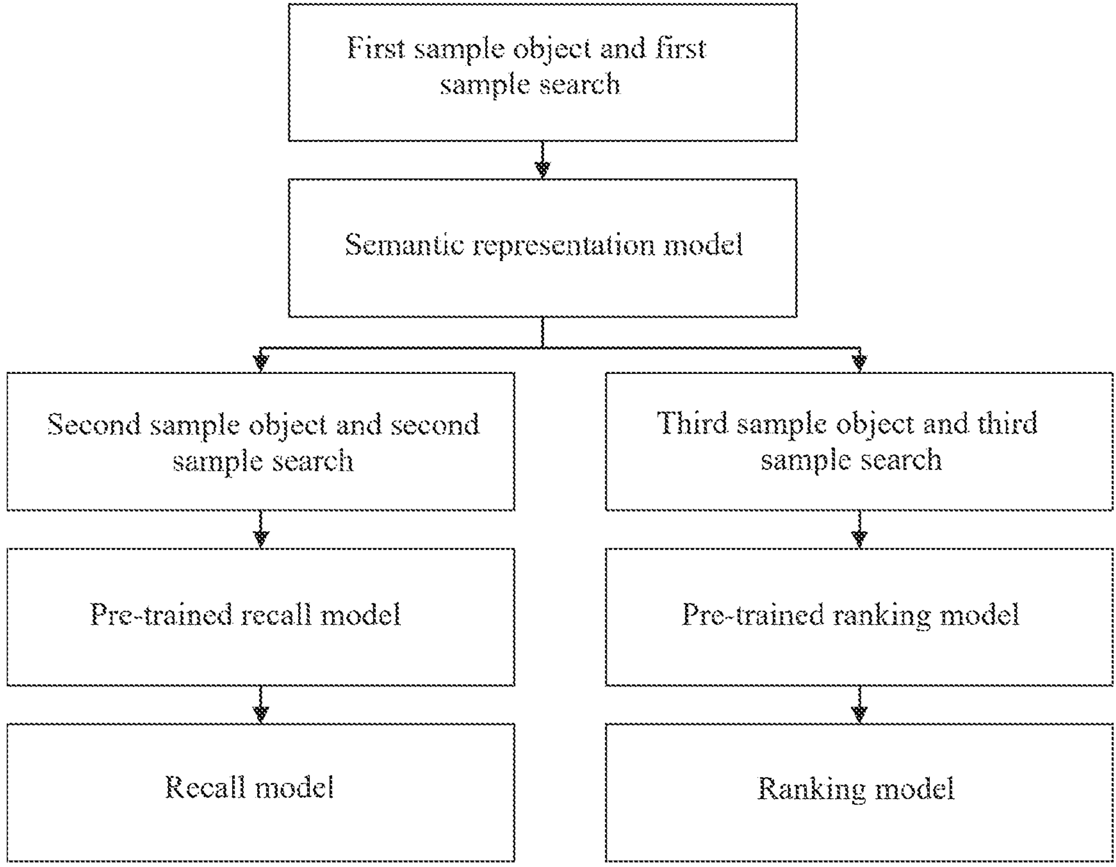
FIG. 5 is a schematic diagram of a training method for a neural network model for searching according to an embodiment of the present disclosure.

FIG. 5 is a schematic diagram of a training method for a neural network model for searching according to an embodiment of the present disclosure. As shown in FIG. 5, the training method for the neural network model for searching includes: training a semantic representation model and a feature extraction model by using a first sample object and a first sample search, and using the trained semantic representation model for subsequent training for a recall model and a ranking model; using a second sample object and a second sample search as training data and training a pre-trained recall model based on the trained semantic representation model, to adjust a parameter of the recall model and obtain a final recall model; and using a third sample object and a third sample search as training data and training a pre-trained ranking model based on the trained semantic representation model, to adjust a parameter of the ranking model and obtain a final ranking model. Corresponding data structures of the training data used to train the recall model and the training data used to train the ranking model may be constructed depending on corresponding training scenarios, to optimize prediction performance of the recall model and the ranking model.

Figure 6:
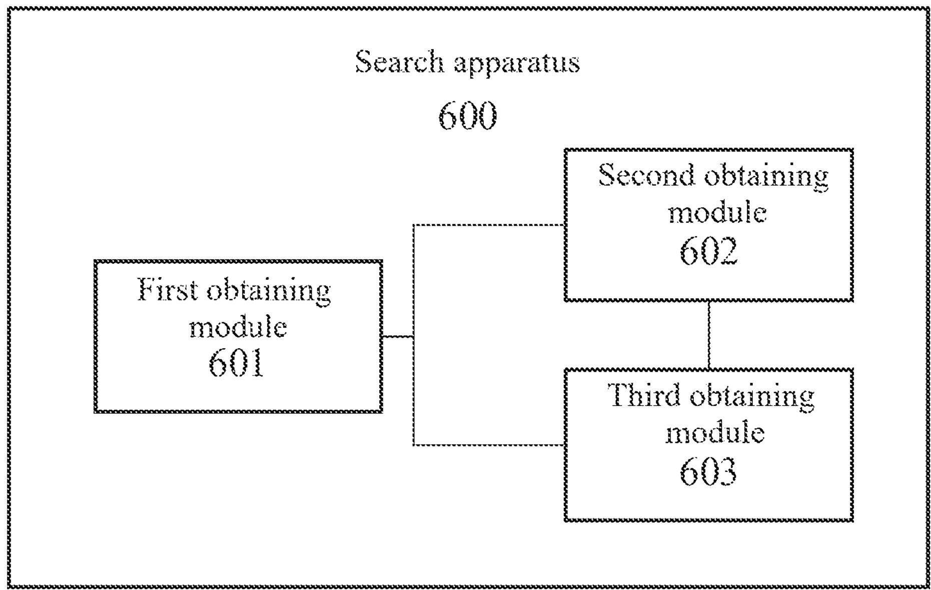
FIG. 6 is a structural block diagram of a search apparatus based on a neural network model according to an embodiment of the present disclosure.

According to an aspect of the present disclosure, there is provided a search apparatus based on a neural network model. The neural network model includes a semantic representation model, a recall model, and a ranking model. As shown in FIG. 6, the search apparatus 600 includes: a first obtaining module 601 configured to input a target search and a plurality of objects to be matched to the semantic representation model to obtain a first output of the semantic representation model, where the first output has a semantic understanding representation of recall and ranking; a second obtaining module 602 configured to input the first output of the semantic representation model to the recall model, and obtain at least one recall object matching the target search from the plurality of objects to be matched by using the recall model; and a third obtaining module 603 configured to input a second output of the semantic representation model to the ranking model, and obtain a matching value of each of the at least one recall object by using the ranking model, where the second output of the semantic representation model is obtained based on the input target search and the at least one recall object.

Therefore, the second obtaining module 602 uses the recall model in the neural network model to recall a matching object based on the target search, and then the third obtaining module 603 uses the ranking model to calculate the matching value of a recalled object and rank the recalled object based on the matching value; and operations of the recall model and the ranking model are both based on the semantic representation model. Therefore, a recall stage and a ranking stage have the same semantic representation for a search object and the objects to be matched, and a target and distribution of parameters of the two stages are more consistent, thus improving a final ranking effect.

According to an aspect of the present disclosure, there is provided a training apparatus for a neural network model for searching, the neural network model including a semantic representation model, a feature extraction model, a recall model, and a ranking model, and the training apparatus including a first training apparatus for training the semantic representation model and the feature extraction model, a second training apparatus for training the recall model, and a third training apparatus for training the ranking model.

Figure 7:
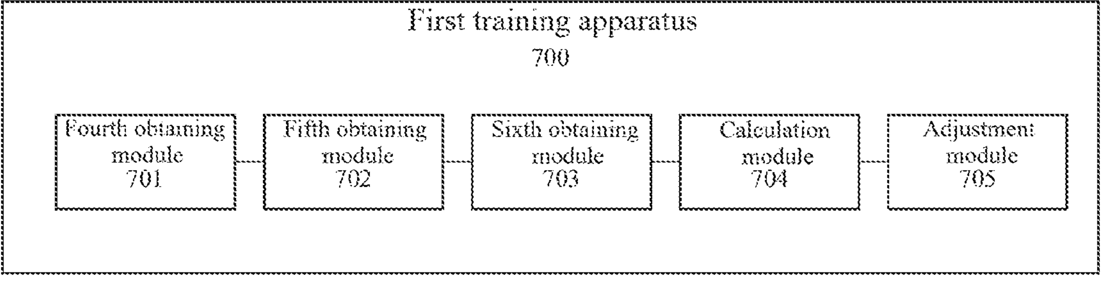
FIG. 7 is a structural block diagram of a first training apparatus for training a semantic representation model and a feature extraction model according to an embodiment of the present disclosure.

FIG. 7 is a structural block diagram of a first training apparatus for training a semantic representation model and a feature extraction model according to an embodiment of the present disclosure. As shown in FIG. 7, the first training apparatus 700 includes: a fourth obtaining module 701 configured to obtain a first sample search and a first sample object, and mark a first real classification label and a first real matching value of the first sample object, where the first real classification label can represent whether the first sample object matches the first sample search, and the first real matching value can represent a degree of matching between the first sample object and the first sample search; a fifth obtaining module 702 configured to input the first sample search and the first sample object to the semantic representation model to obtain a third output of the semantic representation model; a sixth obtaining module 703 configured to input the third output of the semantic representation model to the feature extraction model to obtain a first predicted classification label and a first predicted matching value of the first sample object that are output by the feature extraction model; a calculation module 704 configured to calculate a first loss value based on the first real classification label and the first real matching value of the first sample object and the first predicted classification label and the first predicted matching value of the first sample object; and an adjustment module 705 configured to adjust a parameter of the semantic representation model and a parameter of the feature extraction model based on the first loss value.

Operations of the modules 701 to 705 of the first training apparatus 700 are similar to operations of steps S201 to S205 described above. Details are not described herein again.

According to some embodiments, the second training apparatus and the third training apparatus each are configured to perform a respective training operation in response to completion of a training operation of the first training apparatus, and the second training apparatus is configured to input an output of the semantic representation model to the recall model, and the third training apparatus is configured to input the output of the semantic representation model to the ranking model.

According to the embodiments of the present disclosure, there are further provided an electronic device, a readable storage medium, and a computer program product.

Figure 8:
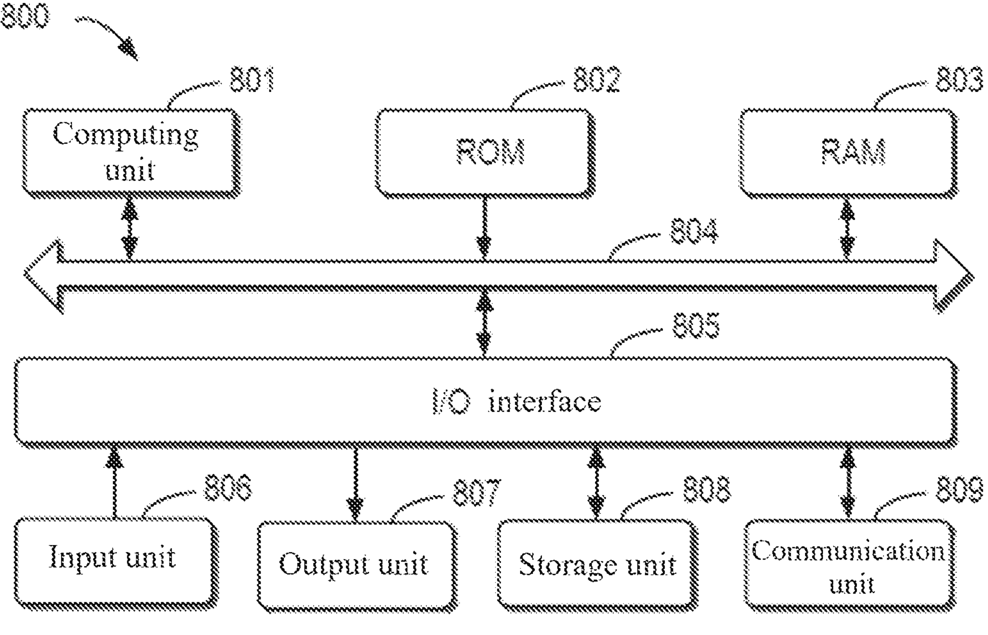
FIG. 8 is a structural block diagram of an example electronic device that can be used to implement an embodiment of the present disclosure.

Referring to FIG. 8, a structural block diagram of an electronic device 800 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 8, the device 800 includes a computing unit 801, which may perform various appropriate actions and processing according to a computer program stored in a read-only memory (ROM) 802 or a computer program loaded from a storage unit 808 to a random access memory (RAM) 803. The RAM 803 may further store various programs and data required for the operation of the device 800. The computing unit 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, an output unit 807, the storage unit 808, and a communication unit 809. The input unit 806 may be any type of device capable of entering information to the device 800. The input unit 806 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 807 may be any type of device capable of presenting information, and may include, but is not limited to, a display, a speaker, a video/audio output terminal, a vibrator, and/or a printer. The storage unit 808 may include, but is not limited to, a magnetic disk and an optical disc. The communication unit 809 allows the device 800 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMAX device, a cellular communication device, and/or the like.

The computing unit 801 may be various general-purpose and/or special-purpose processing components with processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 801 performs the various methods and processing described above, for example, the search method based on the neural network model or the training method for the neural network model for searching. For example, in some embodiments, the search method based on the neural network model or the training method for the neural network model for searching may be implemented as a computer software program, which is tangibly contained in a machine-readable medium, such as the storage unit 808. In some embodiments, a part or all of the computer program may be loaded and/or installed onto the device 800 via the ROM 802 and/or the communication unit 809. When the computer program is loaded onto the RAM 803 and executed by the computing unit 801, one or more steps of the search method based on the neural network model or the training method for the neural network model for searching described above can be performed. Alternatively, in other embodiments, the computing unit 801 may be configured, by any other suitable means (for example, by means of firmware), to perform the search method based on the neural network model or the training method for the neural network model for searching.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely example embodiments or examples, and the scope of the present disclosure is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A search method based on a neural network model, the neural network model comprising a semantic representation model, a recall model, and a ranking model, and the method being performed by an electronic device and comprising:

inputting, to the semantic representation model shared by both the recall model and the ranking model, a target search and a plurality of objects to be matched to obtain a first output of the semantic representation model, wherein the first output has a semantic understanding representation of recall and ranking;

inputting the first output of the semantic representation model to the recall model, and obtaining at least one recall object matching the target search from the plurality of objects to be matched by using the recall model, wherein the recall model makes a binary classification prediction on the plurality of objects to be matched to determine whether the plurality of objects to be matched match the target search;

inputting, to the semantic representation model shared by both the recall model and the ranking model, the target search and the at least one recall object matching the target search to obtain a second output of the semantic representation model, wherein the second output comprises a semantic understanding representation of recall and ranking; and inputting the second output of the semantic representation model to the ranking model, and obtaining a matching value of each of the at least one recall object by using the ranking model.

2. The method according to claim 1, wherein the neural network model further comprises a feature extraction model, and the feature extraction model is configured to:

obtain, based on the first output of the semantic representation model, one or more recall objects and a matching value of each of the one or more recall objects.

3. The method according to claim 2, wherein operations for training the neural network model comprise operations for training the semantic representation model and the feature extraction model, operations for training the recall model, and operations for training the ranking model, wherein the operations for training the semantic representation model and the feature extraction model comprises:

obtaining a first sample search and a first sample object, and marking a first real classification label and a first real matching value of the first sample object, wherein the first real classification label represents whether the first sample object matches the first sample search, and the first real matching value represents a degree of matching between the first sample object and the first sample search;

inputting the first sample search and the first sample object to the semantic representation model to obtain a third output of the semantic representation model;

inputting the third output of the semantic representation model to the feature extraction model to obtain a first predicted classification label and a first predicted matching value of the first sample object;

calculating a first loss value based on the first real classification label and the first real matching value of the first sample object and the first predicted classification label and the first predicted matching value of the first sample object; and adjusting a parameter of the semantic representation model and a parameter of the feature extraction model based on the first loss value, wherein the operations for training the recall model and the operations for training for the ranking model are performed in response to completion of training for the semantic representation model and the feature extraction model, and an input to the recall model and an input to the ranking model each comprises an output of the semantic representation model.

4. The method according to claim 3, wherein when performing at least one of the operations for training the recall model and the operations for training the ranking model, the parameter of the semantic representation model is fixed.

5. The method according to claim 4, wherein the operations for training the recall model comprises:

obtaining a second sample search and a second sample object, and marking a second real classification label of the second sample object, wherein the second real classification label represents whether the second sample object matches the second sample search;

inputting the second sample search and the second sample object to the semantic representation model to obtain a fourth output of the semantic representation model;

inputting the fourth output of the semantic representation model to the recall model to obtain a second predicted classification label of the second sample object;

calculating a second loss value based on the second real classification label of the second sample object and the second predicted classification label of the second sample object; and adjusting a parameter of the recall model based on the second loss value.

6. The method according to claim 5, wherein the second sample object comprises a positive sample object that matches the second sample search and a negative sample object that does not match the second sample search.

7. The method according to claim 4, wherein the operations for training the ranking model comprises:

obtaining a third sample search and a third sample object matching the third sample search, and marking a second real matching value of the third sample object, wherein the second real matching value represents a degree of matching between the third sample object and the third sample search;

inputting the third sample search and the third sample object to the semantic representation model to obtain a fifth output of the semantic representation model;

inputting the fifth output of the semantic representation model to the ranking model to obtain a second predicted matching value of the third sample object;

calculating a third loss value based on the second real matching value of the third sample object and the second predicted matching value of the third sample object; and adjusting a parameter of the ranking model based on the third loss value.

8. The method according to claim 7, wherein the second real matching value lies in an interval [0,1].

9. The method according to claim 3, wherein at least one of the recall model and the ranking model is a pre-trained model.

10. The method according to claim 3, wherein the first loss value comprises a first sub-loss value and a second sub-loss value, and the calculating the first loss value comprises:

calculating the first sub-loss value based on the first real classification label of the first sample object and the first predicted classification label of the first sample object;

calculating the second sub-loss value based on the first real matching value of the first sample object and the first predicted matching value of the first sample object; and calculating the first loss value based on the first sub-loss value and a first weight thereof and the second sub-loss value and a second weight thereof, wherein the operations for training the semantic representation model and the feature extraction model further comprises:

adjusting the first weight and the second weight based on the first loss value.

11. The method according to claim 10, wherein the first sample object comprises a positive example object that matches the first sample search and a negative example object that does not match the first sample search.

12. An electronic device, comprising:

at least one processor; and a memory communicatively connected to the at least one processor, wherein the memory stores instructions executable by the at least one processor, and when executed by the at least one processor, the instructions cause the at least one processor to perform a method based on a neural network model including a semantic representation model, a recall model, and a ranking model, the method comprising:

inputting, to the semantic representation model shared by both the recall model and the ranking model, a target search and a plurality of objects to be matched to obtain a first output of the semantic representation model, wherein the first output has a semantic understanding representation of recall and ranking;

inputting the first output of the semantic representation model to the recall model, and obtaining at least one recall object matching the target search from the plurality of objects to be matched by using the recall model, wherein the recall model makes a binary classification prediction on the plurality of objects to be matched to determine whether the plurality of objects to be matched match the target search;

inputting, to the semantic representation model shared by both the recall model and the ranking model, the target search and the at least one recall object matching the target search to obtain a second output of the semantic representation model, wherein the second output comprises a semantic understanding representation of recall and ranking; and inputting the second output of the semantic representation model to the ranking model, and obtaining a matching value of each of the at least one recall object by using the ranking model.

13. The electronic device according to claim 12, wherein the neural network model further comprises a feature extraction model, and the feature extraction model is configured to:

obtain, based on the first output of the semantic representation model, one or more recall objects and a matching value of each of the one or more recall objects.

14. An electronic device, comprising:

at least one processor; and a memory communicatively connected to the at least one processor, wherein the memory stores instructions executable by the at least one processor, and when executed by the at least one processor, the instructions cause the at least one processor to perform the method according to claim 3.

15. The electronic device according to claim 14, wherein when performing at least one of the operations for training the recall model and the operations for training the ranking model, the parameter of the semantic representation model is fixed.

16. The electronic device according to claim 15, wherein the operations for training the recall model comprises:

obtaining a second sample search and a second sample object, and marking a second real classification label of the second sample object, wherein the second real classification label represents whether the second sample object matches the second sample search;

inputting the second sample search and the second sample object to the semantic representation model to obtain a fourth output of the semantic representation model;

inputting the fourth output of the semantic representation model to the recall model to obtain a second predicted classification label of the second sample object;

calculating a second loss value based on the second real classification label of the second sample object and the second predicted classification label of the second sample object; and adjusting a parameter of the recall model based on the second loss value.

17. The electronic device according to claim 16, wherein the second sample object comprises a positive sample object that matches the second sample search and a negative sample object that does not match the second sample search.

18. The electronic device according to claim 15, wherein the operations for training the ranking model comprises:

obtaining a third sample search and a third sample object matching the third sample search, and marking a second real matching value of the third sample object, wherein the second real matching value represents a degree of matching between the third sample object and the third sample search;

inputting the third sample search and the third sample object to the semantic representation model to obtain a fifth output of the semantic representation model;

inputting the fifth output of the semantic representation model to the ranking model to obtain a second predicted matching value of the third sample object;

calculating a third loss value based on the second real matching value of the third sample object and the second predicted matching value of the third sample object; and adjusting a parameter of the ranking model based on the third loss value.

19. A non-transitory computer-readable storage medium storing computer instructions, wherein the computer instructions, when executed by one or more processors, are used to cause the computer to perform the method according to claim 1.

20. A non-transitory computer-readable storage medium storing computer instructions, wherein the computer instructions, when executed by one or more processors, are used to cause the computer to perform the method according to claim 3.

* * * * *